United States Patent
Zhang

(10) Patent No.: US 9,906,737 B2
(45) Date of Patent: Feb. 27, 2018

(54) CO-APERTURE MULTI-FOV IMAGE-SPECTRUM COOPERATIVE DETECTION SYSTEM AND METHOD

(71) Applicants: NANJING HUATU INFORMATION TECHNOLOGY CO., LTD, Nanjing, Jiangsu (CN); Tianxu Zhang, Wuhan, Hubei (CN)

(72) Inventor: Tianxu Zhang, Hubei (CN)

(73) Assignees: Nanjing Huatu Information Technology Co., Ltd., Nanjing, Jiangsu (CN); Tianxu Zhang, Whuhan, Hubei (CN)

( * ) Notice: Subject to any disclaimer, the term of this patent is extended or adjusted under 35 U.S.C. 154(b) by 142 days.

(21) Appl. No.: 15/184,659

(22) Filed: Jun. 16, 2016

(65) Prior Publication Data
US 2017/0195582 A1  Jul. 6, 2017

(30) Foreign Application Priority Data
Dec. 31, 2015  (CN) .......................... 2015 1 1026696

(51) Int. Cl.
H04N 5/33 (2006.01)
H04N 5/265 (2006.01)
(Continued)

(52) U.S. Cl.
CPC ............. *H04N 5/33* (2013.01); *G01J 3/0289* (2013.01); *G01J 3/0294* (2013.01); *G01J 3/06* (2013.01);
(Continued)

(58) Field of Classification Search
CPC ........ H04N 5/33; H04N 5/265; H04N 5/2258; G01J 3/0289; G01J 3/0294; G01J 3/06;
(Continued)

(56) References Cited

U.S. PATENT DOCUMENTS

| | | | | |
|---|---|---|---|---|
| 7,038,789 | B1 * | 5/2006 | Carrieri | G01J 3/02 356/491 |
| 2005/0029458 | A1 * | 2/2005 | Geng | G08B 13/19608 250/347 |

* cited by examiner

*Primary Examiner* — Sherrie Hsia
(74) *Attorney, Agent, or Firm* — Hamre, Schumann, Mueller & Larson, P.C.

(57) ABSTRACT

The present invention discloses a co-aperture multi-field of view (FOV) image-spectrum cooperative detection system, and the system includes an infrared optical window, a large FOV two-dimensional scanning mirror, a co-aperture multi-FOV main optical system, a large FOV scanning detector, a staring infrared detector, an infrared non-imaging broadband spectrum measuring unit, a data processing unit, a control unit, and a servo system. Correspondingly, the present invention further provides a method based on the system. The present invention searches a target area by using large FOV scanning, and identifies a target by using medium FOV staring infrared detection, and small FOV fine detection is finally performed on the area to identify the target in combination with spectrum data analysis. The detection sensitivity is higher, and capturing and tracking of a moving target are more precise and stable, thereby solving the technical problems that a conventional remote sensing detection cannot perform research on movement changes of a moving target and a dynamic phenomenon and searching and tracking of a small-scale object is unsuccessful; therefore, the present invention has higher implementability and practical promotion values.

8 Claims, 3 Drawing Sheets

(51) Int. Cl.
*G01J 3/02* (2006.01)
*G01J 3/06* (2006.01)
*G01J 3/28* (2006.01)
*G02B 17/08* (2006.01)
*G06K 9/62* (2006.01)
*G06K 9/20* (2006.01)
*G06K 9/32* (2006.01)
*H04N 5/225* (2006.01)

(52) U.S. Cl.
CPC ........ *G01J 3/2823* (2013.01); *G02B 17/0808* (2013.01); *G06K 9/2018* (2013.01); *G06K 9/3241* (2013.01); *G06K 9/6267* (2013.01); *H04N 5/265* (2013.01); *H04N 5/2258* (2013.01)

(58) Field of Classification Search
CPC . G01J 3/2823; G02B 17/0808; G06K 9/2018; G06K 9/3241; G06K 9/6267
USPC .......................................... 348/164, 169–171
IPC ............................................... H04N 5/33,5/265
See application file for complete search history.

CO-APERTURE MULTI-FOV IMAGE-SPECTRUM COOPERATIVE DETECTION SYSTEM AND METHOD

TECHNICAL FIELD

The present invention relates to the interdisciplinary field of remote sensing and control, spectrum analysis and image identification, and in particular, to a co-aperture multi-FOV image-spectrum cooperative detection system and method.

BACKGROUND ART

Remote sensing detection is in the technical fields of frontier sciences implementing sci-tech power of China. A conventional infrared fixed-focus system has a single field of view (FOV), and cannot implement searching and tracking at the same time. An intelligent multiple-spatial resolution sensor can intelligently adjust continuous change of the focal length according to requirement of a detector to change the size of the FOV; therefore, the image is stable, good image quality can be kept, and a target is not easily lost. As a result, the intelligent multi-spatial resolution sensor has both large FOV large-scale searching and small FOV small-scale tracking functions. Moreover, appropriate focal lengths may be selected according to different application environments and observed objects, so as to achieve the optimal observation effect, thereby having certain practical meaning.

However, for an application scenario of multi-FOV target detection, the existing remote sensing detection technology has the following defects: (1) the conventional remote sensing detection measure cannot take low/medium/high resolutions into account or track and detect movement changes of a moving target and a dynamic phenomenon; and (2) the existing remote sensing detection technology cannot work for a small-scale object, cannot implement searching and tracking at the same time, and lacks of related theoretical methods and technical measures; correspondingly, a system and method applicable to a multi-FOV target detection application scenario is in urgent need in this field.

SUMMARY

Directed to the above defects of the prior art, the present invention provides a co-aperture multi-FOV image-spectrum cooperative detection system and method, by using large FOV large-scale scanning and searching, medium FOV infrared staring identification and small FOV small-scale tracking identification, the detection sensitivity is higher, and capturing, tracking and identification of a moving object are more precise and stable; therefore, the present invention is especially suitable for an application scenario of a multi-FOV moving object detection environment.

To achieve the above objective, according to an aspect of the present invention, a co-aperture multi-FOV image-spectrum cooperative detection system is provided, where the system includes an infrared optical window, a large FOV two-dimensional scanning mirror, a co-aperture multi-FOV main optical system, a large FOV scanning detector, a staring infrared detector, an infrared non-imaging broadband spectrum measuring unit, a data processing unit, a control unit, and a servo system, where the large FOV two-dimensional scanning mirror is controlled by the servo system to rotate and adjust an orientation to aim at a target area, and is used for reflecting the light of the target area to the co-aperture multi-FOV main optical system;

the co-aperture multi-FOV main optical system is used for focusing large FOV scanning infrared light to the large FOV scanning detector, focusing staring infrared light to the staring infrared detector; and at the same time, focusing the rest of light to the infrared non-imaging broadband spectrum measuring unit for spectrum measurement;

the large FOV scanning detector is used for performing large FOV infrared imaging on the target area, and transmitting the infrared image after analog-to-digital (A/D) conversion to the data processing unit;

the staring infrared detector is used for performing staring infrared imaging on the target area, and transmitting the infrared image after A/D conversion to the data processing unit;

the infrared non-imaging broadband spectrum measuring unit is used for performing spectrum measurement analysis on the target, and transmitting infrared spectrum data of the target to the data processing unit;

the data processing unit is used for merging the large FOV scanning infrared image data, the staring infrared image data, and the infrared broadband spectrum data of the target; and the control unit is used for controlling, by the servo system, the large FOV two-dimensional scanning mirror to track movement of a moving target and a dynamic phenomenon according to a data processing result obtained by the merging of the data processing unit.

More preferably, the co-aperture multi-FOV main optical system includes a Cassegrain reflector group, a broadband spectrum relay mirror, a first lens group, a second lens group, a third lens group, a fourth lens group, a fifth lens group, a first spectroscope and a second spectroscope.

More preferably, the Cassegrain reflector group is used for reflecting the light reflected by the large FOV two-dimensional scanning mirror to the broadband spectrum relay mirror; the broadband spectrum relay mirror is used for focusing the light to the first lens group; the first spectroscope is used for partially transmitting the light from the first lens group to the second lens group, the second lens group focusing the light to a large FOV focal plane, and the rest of light being reflected to the third lens group; and the second spectroscope is used for partially reflecting the light from the third lens group to the fourth lens group, the fourth lens group focusing the light to a medium FOV focal plane, the rest of light being reflected to the fifth lens group and being focused by the fifth lens group to a small-view-FOV focal plane.

More preferably, the Cassegrain reflector group adopts a Cassegrain system, and is composed of a parabolic reflector and a hyperbolic reflector, to implement infrared spectrum imaging and energy convergence on the target area, a shielding ratio of the parabolic reflector to the hyperbolic reflector being not greater than 1:3.

More preferably, the first lens group is a large FOV lens group; the third lens group is a medium FOV lens group; the fifth lens group is a small FOV lens group; and the second lens group and the fourth lens group are broadband spectrum lens groups, used for compensating and correcting spot quality of infrared broadband spectrum energy convergence.

More preferably, an integrated focal length of the first lens group, the first spectroscope and the second lens group is f1; an integrated focal length of the first lens group, the third lens group, the second spectroscope and the fourth lens group is f2=af1, a>1; and an integrated focal length of the first lens group, the first spectroscope, the third lens group, the second spectroscope and the fifth lens group is f3=bf2, b>a.

More preferably, the fifth lens group and the infrared non-imaging broadband spectrum measuring unit are optically coupled.

According to another aspect of the present invention, a detection method based on the co-aperture multi-FOV image-spectrum cooperative detection system is provided, where the method includes:

(1) a large FOV two-dimensional scanning mirror searching an FOV;

(2) collecting a large FOV infrared image directed to a target area, so as to detect whether there is a suspected target;

(3) if a suspected target is detected, staring the target area using a medium FOV, and acquiring an infrared image of the target area; and if no suspected target is detected, searching the target area continuously in a large FOV;

(4) aiming the suspected target by using a small FOV, and collecting infrared spectrum data of the target;

(5) merging infrared images, in multiple FOVs and of multiple different resolutions, and spectrum information of the target; and (6) identifying the target, and outputting a target type.

In general, compared with the prior art, the above technical solution according to the present invention mainly has the following technical advantages:

1. In the co-aperture multi-FOV image-spectrum cooperative detection system and the corresponding method provided in the present invention, different objects or substances may be distinguished through spectrum signatures of substances, and with the addition of infrared image information of multiple spatial resolutions of the object, the capability to identify an object of the remote sensing and detecting is stronger.

2. Moreover, the present invention performs searching on the target area through large FOV scanning, then identifies the target through medium FOV staring infrared detection, and finally performs small FOV fine detection on the area, so as to identify the target in combination with spectrum data analysis; therefore, the detection sensitivity is higher, and the identification of an object is more accurate.

DETAILED DESCRIPTION

In order to make the objectives, technical solutions and advantages of the present invention more comprehensible, the present invention is further described in detail in combination with the accompanying drawings and embodiments in the following. It should be noted that, the specific embodiments described herein are merely used to explain the present invention, and are not intended to limit the present invention.

Figure 1:
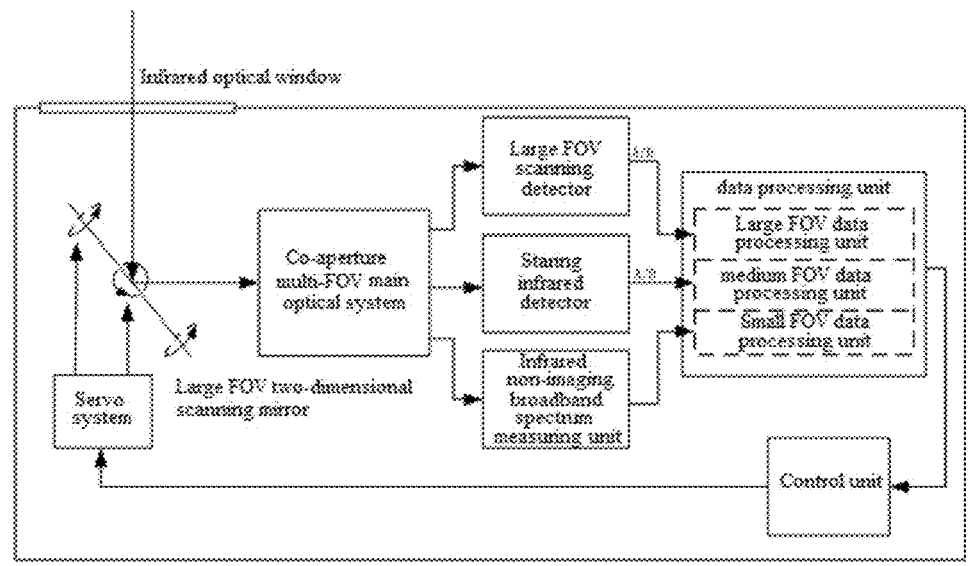
FIG. 1 is a schematic diagram of a co-aperture multi-FOV image-spectrum cooperative detection system according to the present invention.

The present invention provides a co-aperture multi-FOV image-spectrum cooperative detection system, and integrates multiple-spatial resolution imaging and small FOV high-resolution spectrum measurement functions. As shown in FIG. 1, the detection system includes an infrared optical window, a co-aperture multi-FOV main optical system, a large FOV scanning detector, a staring infrared detector, an infrared non-imaging broadband spectrum measuring unit, a data processing unit, a control unit and a servo system. The large FOV two-dimensional scanning mirror is controlled by the servo system to rotate and adjust an orientation to aim at a target area, and is used for reflecting the light of the target area to the co-aperture multi-FOV main optical system; the co-aperture multi-FOV main optical system is used for focusing large FOV scanning infrared light to the large FOV scanning detector, focusing staring infrared light to the staring infrared detector; and at the same time, focusing the rest of light to the infrared broadband spectrum measuring unit for spectrum measurement; the large FOV scanning detector is used for performing large FOV infrared imaging on the target area, and transmitting the infrared image after A/D conversion to the data processing unit; the staring infrared detector is used for performing staring infrared imaging on the target area, and transmitting the infrared image after A/D conversion to the data processing unit; the infrared non-imaging broadband spectrum measuring unit is used for performing spectrum measurement analysis on the target, and transmitting infrared spectrum data of the target to the data processing unit; the data processing unit is used for merging the large FOV scanning infrared image data, the staring infrared image data, and the infrared broadband spectrum data of the target; and the control unit is used for controlling, by the servo system, the scanning mirror to track movement of a moving target and a dynamic phenomenon according to a data processing result obtained by the merging of the data processing unit.

Further, the co-aperture multi-FOV main optical system includes a Cassegrain reflector group, a broadband spectrum relay mirror, a first lens group, a second lens group, a third lens group, a fourth lens group, a fifth lens group, a first spectroscope and a second spectroscope.

Further, the Cassegrain reflector group is used for reflecting the light reflected by the large FOV two-dimensional scanning mirror to the broadband spectrum relay mirror; the broadband spectrum relay mirror is used for focusing the light to the first lens group; the first spectroscope is used for partially transmitting the light from the first lens group to the second lens group, the second lens group focusing the light to a large FOV focal plane, and the rest of light being reflected to the third lens group; and the second spectroscope is used for partially reflecting the light from the third lens group to the fourth lens group, the fourth lens group focusing the light to a medium FOV focal plane, the rest of light being reflected to the fifth lens group and being focused by the fifth lens group to a small-view-FOV focal plane.

Further, the Cassegrain reflector group adopts a Cassegrain system, and is composed of a parabolic reflector and a hyperbolic reflector, to implement infrared spectrum imaging and energy convergence on the target area, a shielding ratio of the parabolic reflector to the hyperbolic reflector being not greater than 1:3.

Figure 3:
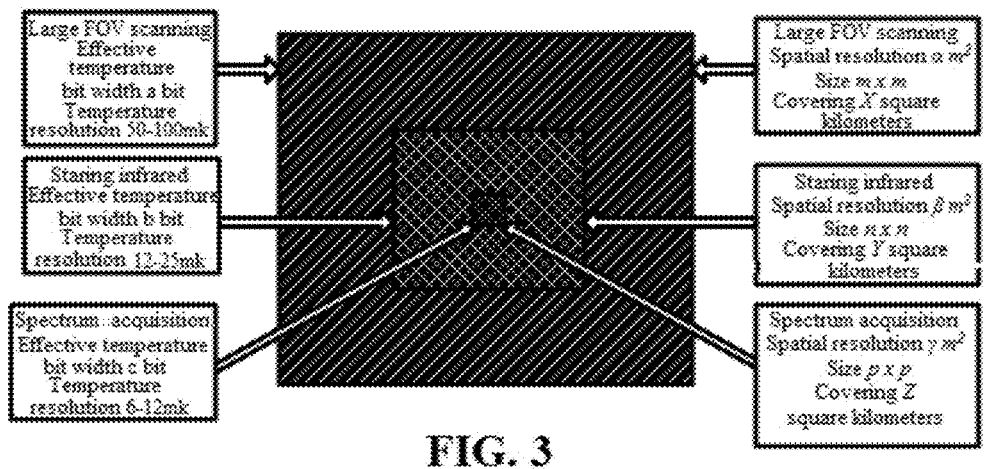
FIG. 3 is a schematic diagram of a co-aperture multi-FOV image-spectrum cooperative detection method according to the present invention.

In an implementation example of the present invention, as shown in FIG. 3, the first FOV lens group is a large FOV lens group, having a lower spatial resolution; the third lens group is a medium FOV lens group, having a higher spatial resolution; the fifth lens group is a small FOV lens group, having the highest spatial resolution; and the second and fourth lens groups are broadband spectrum lens groups, used for compensating and correcting spot quality of infrared broadband spectrum energy convergence.

Further, the fifth lens group and the infrared non-imaging broadband spectrum measuring unit are optically coupled.

Further, an integrated focal length of the first lens group, the first spectroscope and the second lens group is f1; an integrated focal length of the first lens group, the third lens group, the second spectroscope and the fourth lens group is f2=af1, a>1; and an integrated focal length of the first lens group, the first spectroscope, the third lens group, the second spectroscope and the fifth lens group is f3=bf2, b>a.

Further, readout circuit chips of the large FOV scanning detector and the staring infrared detector are integrated with an AD conversion function, so that an infrared focal plane array detector directly outputs a digital signal.

Figure 4:
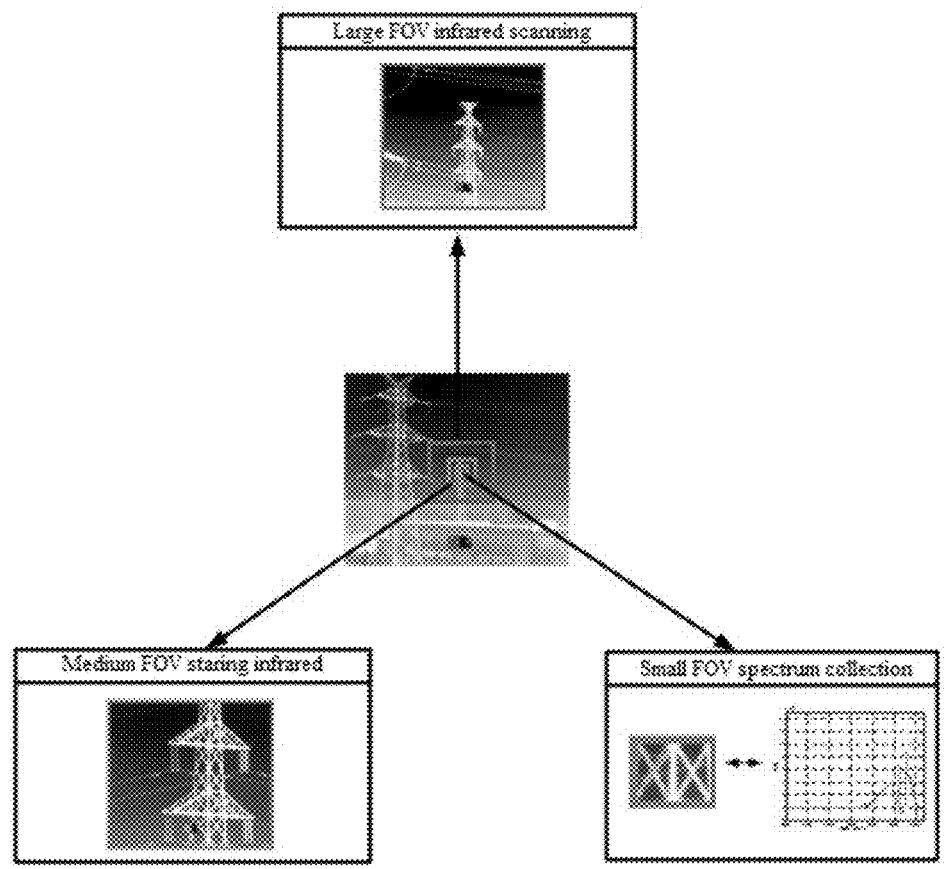
FIG. 4 is an instance diagram of co-aperture multi-FOV image-spectrum cooperative detection according to the present invention.

FIG. 4 shows an instance diagram of detecting an actual target by applying the co-aperture multi-FOV image-spectrum cooperative detection system of the present invention.

Figure 5:
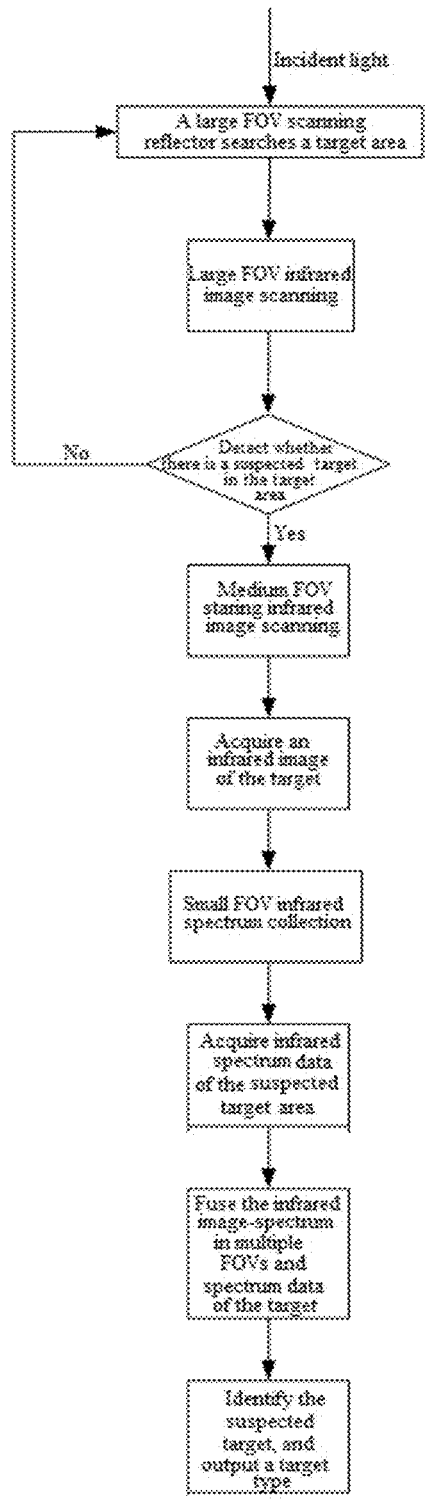
FIG. 5 is a flow chart of a co-aperture multi-FOV image-spectrum cooperative detection method according to the present invention.

Further, as shown in FIG. 5, the present invention provides a flow chart of a detection method based on the co-aperture multi-FOV image-spectrum cooperative detection system, and the specific steps of the method are as follows:

(7) a large FOV two-dimensional scanning mirror searching an FOV;

(8) collecting a large FOV infrared image directed to a target area, so as to detect whether there is a suspected target;

(9) if a suspected target is detected, staring the target area using a medium FOV, and acquiring an infrared image of the target area; and if no suspected target is detected, searching the target area continuously in a large FOV;

(10) aiming the suspected target by using a small FOV, and collecting infrared spectrum data of the target;

(11) merging infrared images, in multiple FOVs and of multiple different resolutions, and spectrum information of the target; and

(12) identifying the target, and outputting a target type.

Figure 2:
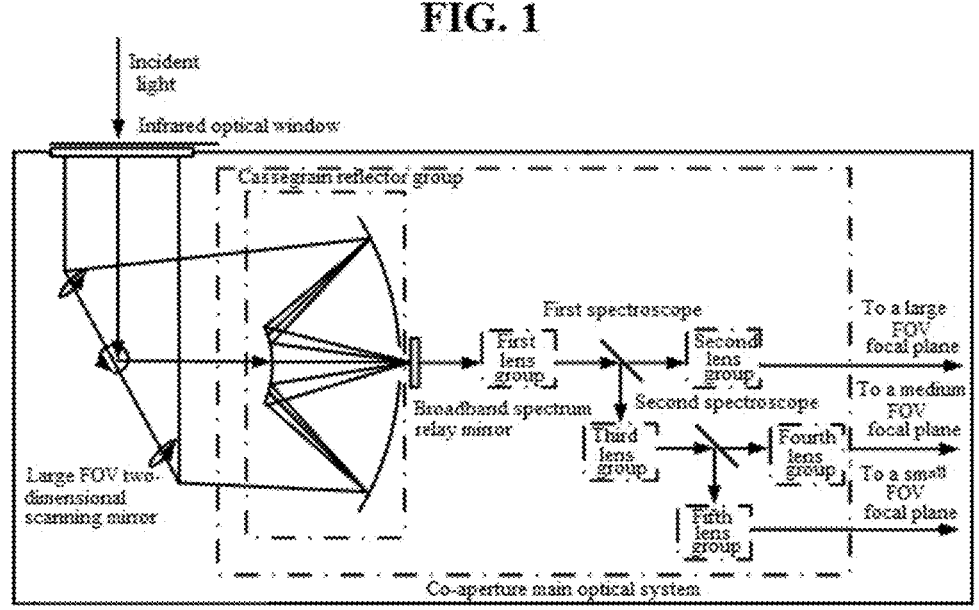
FIG. 2 is a layout diagram of a co-aperture main optical system according to the present invention.

Further, the implementation of the detection method of the present invention is described by taking the co-aperture multi-FOV image-spectrum cooperative detection system in FIG. 1 as an example, specifically: in FIG. 2, the co-aperture multi-FOV main optical system is composed of a Cassegrain reflector group, a broadband spectrum relay mirror, a first lens group, a second lens group, a third lens group, a fourth lens group, a fifth lens group, a first spectroscope and a second spectroscope. Target incident light is reflected by a large FOV two-dimensional scanning reflector to a co-aperture multi-FOV main optical system, and the co-aperture main optical system focuses large FOV scanning infrared light to a large FOV scanning detector, focuses staring infrared light to a staring infrared detector, and at the same time, focuses the rest of light to an infrared broadband spectrum measuring unit for spectrum measurement. The large FOV scanning detector performs large FOV infrared imaging on the target area, and transmits the infrared image after A/D conversion to a data processing unit. The staring infrared detector performs staring infrared imaging on the target area, and transmits the infrared image after A/D conversion to the data processing unit. The infrared non-imaging broadband spectrum measuring unit performs spectrum measurement analysis on the target, and transmits infrared spectrum data of the target to the data processing unit. The data processing unit merges the large FOV scanning infrared image data, the staring infrared image data, and the infrared broadband spectrum data of the target. The control unit controls, by the servo system, the scanning mirror to track movement of a moving target and a dynamic phenomenon according to a data processing result obtained by the merging of the data processing unit.

A person skilled in the art can easily understand that the above descriptions are merely preferred embodiments of the present invention, and are not intended to limit the present invention. Any modification, equivalent replacement and improvement made without departing from the spirit and principle of the present invention shall all fall within the protection scope of the present invention.

The invention claimed is:

1. A co-aperture multi-field of view (FOV) image-spectrum cooperative detection system, comprising: an infrared optical window, a large FOV two-dimensional scanning mirror, a co-aperture multi-FOV main optical system, a large FOV scanning detector, a staring infrared detector, an infrared non-imaging broadband spectrum measuring unit, a data processing unit, a control unit, and a servo system, wherein the large FOV two-dimensional scanning mirror is controlled by the servo system to rotate and adjust an orientation to aim at a target area, and is used for reflecting the light of the target area to the co-aperture multi-FOV main optical system;

the co-aperture multi-FOV main optical system is used for focusing large FOV scanning infrared light to the large FOV scanning detector, focusing staring infrared light to the staring infrared detector; and at the same time, focusing the rest of light to the infrared non-imaging broadband spectrum measuring unit for spectrum measurement;

the large FOV scanning detector is used for performing large FOV infrared imaging on the target area, and transmitting the infrared image after A/D conversion to the data processing unit;

the staring infrared detector is used for performing staring infrared imaging on the target area, and transmitting the infrared image after A/D conversion to the data processing unit;

the infrared non-imaging broadband spectrum measuring unit is used for performing spectrum measurement analysis on the target, and transmitting infrared spectrum data of the target to the data processing unit;

the data processing unit is used for merging the large FOV scanning infrared image data, the staring infrared image data, and the infrared broadband spectrum data of the target; and the control unit is used for controlling, by the servo system, the large FOV two-dimensional scanning mirror to track movement of a moving target and a dynamic phenomenon according to a data processing result obtained by the merging of the data processing unit.

2. The system according to claim 1, wherein the co-aperture multi-FOV main optical system comprises a Cassegrain reflector group, a broadband spectrum relay mirror, a first lens group, a second lens group, a third lens group, a fourth lens group, a fifth lens group, a first spectroscope and a second spectroscope.

3. The system according to claim 2, wherein, the Cassegrain reflector group is used for reflecting the light reflected by the large FOV two-dimensional scanning mirror to the broadband spectrum relay mirror; the broadband spectrum relay mirror is used for focusing the light to the first lens group; the first spectroscope is used for partially transmitting the light from the first lens group to the second lens group, the second lens group focusing the light to a large FOV focal plane, and the rest of light being reflected to the third lens group; and the second spectroscope is used for partially reflecting the light from the third lens group to the fourth lens group, the fourth lens group focusing the light to a medium FOV focal plane, the rest of light being reflected to the fifth lens group and being focused by the fifth lens group to a small FOV focal plane.

4. The system according to claim 2, wherein the Cassegrain reflector group adopts a Cassegrain system to implement infrared spectrum imaging and energy convergence on the target area, and is composed of a parabolic reflector and a hyperbolic reflector, a shielding ratio of the parabolic reflector to the hyperbolic reflector being not greater than 1:3.

5. The system according to claim 4, wherein, the first lens group is a large FOV lens group; the third lens group is a medium FOV lens group; the fifth lens group is a small FOV lens group; and the second lens group and the fourth lens group are broadband spectrum lens groups, used for compensating and correcting spot quality of infrared broadband spectrum energy convergence.

6. The system according to claim 2, wherein, an integrated focal length of the first lens group, the first spectroscope and the second lens group is f1; an integrated focal length of the first lens group, the third lens group, the second spectroscope and the fourth lens group is $f2=af1$, $a>1$; and an integrated focal length of the first lens group, the first spectroscope, the third lens group, the second spectroscope and the fifth lens group is $f3=bf2$, $b>a$.

7. The system according to claim 2, wherein, the fifth lens group and the infrared non-imaging broadband spectrum measuring unit are optically coupled.

8. A detection method of a co-aperture multi-FOV image-spectrum cooperative detection system according to claim 1, wherein the method comprises:
   (1) a large FOV two-dimensional scanning mirror searching an FOV;
   (2) collecting a large FOV infrared image directed to a target area, so as to detect whether there is a suspected target;
   (3) if a suspected target is detected, staring the target area using a medium FOV, and acquiring an infrared image of the target area; and if no suspected target is detected, searching the target area continuously in a large FOV;
   (4) aiming the suspected target by using a small FOV, and collecting infrared spectrum data of the target;
   (5) merging infrared images, in multiple FOVs and of multiple different resolutions, and spectrum information of the target; and
   (6) identifying the target, and outputting a target type.

* * * * *